(12) United States Patent
Graeve

(10) Patent No.: US 6,475,270 B1
(45) Date of Patent: Nov. 5, 2002

(54) NESTED DIFFUSIONAL FILTER

(75) Inventor: Eric G. Graeve, Eagan, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/576,334

(22) Filed: May 22, 2000

(51) Int. Cl.⁷ ............................ B01D 53/04; B01D 46/12
(52) U.S. Cl. ........................... 96/135; 96/139; 96/147; 96/154; 55/385.6; 55/517; 55/DIG. 5
(58) Field of Search ..................... 96/134, 135, 137, 96/139, 147, 153, 154; 55/385.6, 482, 512, 517

(56) References Cited

U.S. PATENT DOCUMENTS

| | | | | |
|---|---|---|---|---|
| 1,675,228 A | * | 6/1928 | Schmidt | 96/147 |
| 3,090,490 A | * | 5/1963 | Yocum | 96/134 X |
| 3,722,188 A | * | 3/1973 | Cullen | 96/134 X |
| 4,261,710 A | * | 4/1981 | Sullivan | 55/482 X |
| 4,308,041 A | * | 12/1981 | Ellis et al. | 55/517 X |
| 4,614,528 A | * | 9/1986 | Lennen | 96/147 |
| 4,684,381 A | * | 8/1987 | Wasylyniuk | 55/482 X |
| 4,863,499 A | | 9/1989 | Osendorf | 55/316 |
| 5,030,260 A | | 7/1991 | Beck et al. | 55/316 |
| 5,124,856 A | | 6/1992 | Brown et al. | 360/97.03 |
| 5,417,743 A | | 5/1995 | Dauber | 96/13 |
| 5,447,695 A | * | 9/1995 | Brown et al. | 55/385.6 X |
| 5,590,001 A | | 12/1996 | Ino et al. | 360/97.02 |
| 5,593,482 A | * | 1/1997 | Dauber et al. | 96/135 |
| 5,733,271 A | * | 3/1998 | Bjorn | 55/482 X |
| 5,738,816 A | | 4/1998 | Tidemann et al. | 264/553 |
| 5,837,022 A | * | 11/1998 | Chapman | 55/517 X |
| 5,869,009 A | * | 2/1999 | Bellefeuille et al. | 96/135 X |
| 5,997,614 A | | 12/1999 | Tuma et al. | 96/4 |
| 6,214,070 B1 | | 4/2001 | Crowder et al. | 55/320 |
| 6,214,095 B1 | * | 4/2001 | Logan et al. | 96/147 |

* cited by examiner

Primary Examiner—Robert H. Spitzer
(74) Attorney, Agent, or Firm—Gary L. Griswold; Robert W. Sprague; William J. Bond

(57) ABSTRACT

A diffusion channel assembly for use with a device enclosure with two or more nested cups forming at least one diffusion channel. The nested cups are formed of a thermoplastic film material. Each of the cups has a perimeter seal portion substantially around the entire outer perimeter of the cups and surrounding a cup portion having a vent hole. The perimeter seal portions form a sealing surface and are generally integral with the cup portions. The cup portions have vent holes and at least one gap between adjacent cup portions that connect the vent holes of the adjacent cup portions. The gaps coupled with the vent holes of adjacent cup portions form at least one diffusion channel of a length of at least 5 mm. The perimeter seal portions are sealed to form an airtight seal around the cup portion forming an integral diffusion channel assembly. Preferably, a sorbent filter material is included in the cavity formed by the innermost cup portion and is contained in this cup portion by a cover layer attached to the perimeter seal portion of the innermost cup portion.

35 Claims, 9 Drawing Sheets

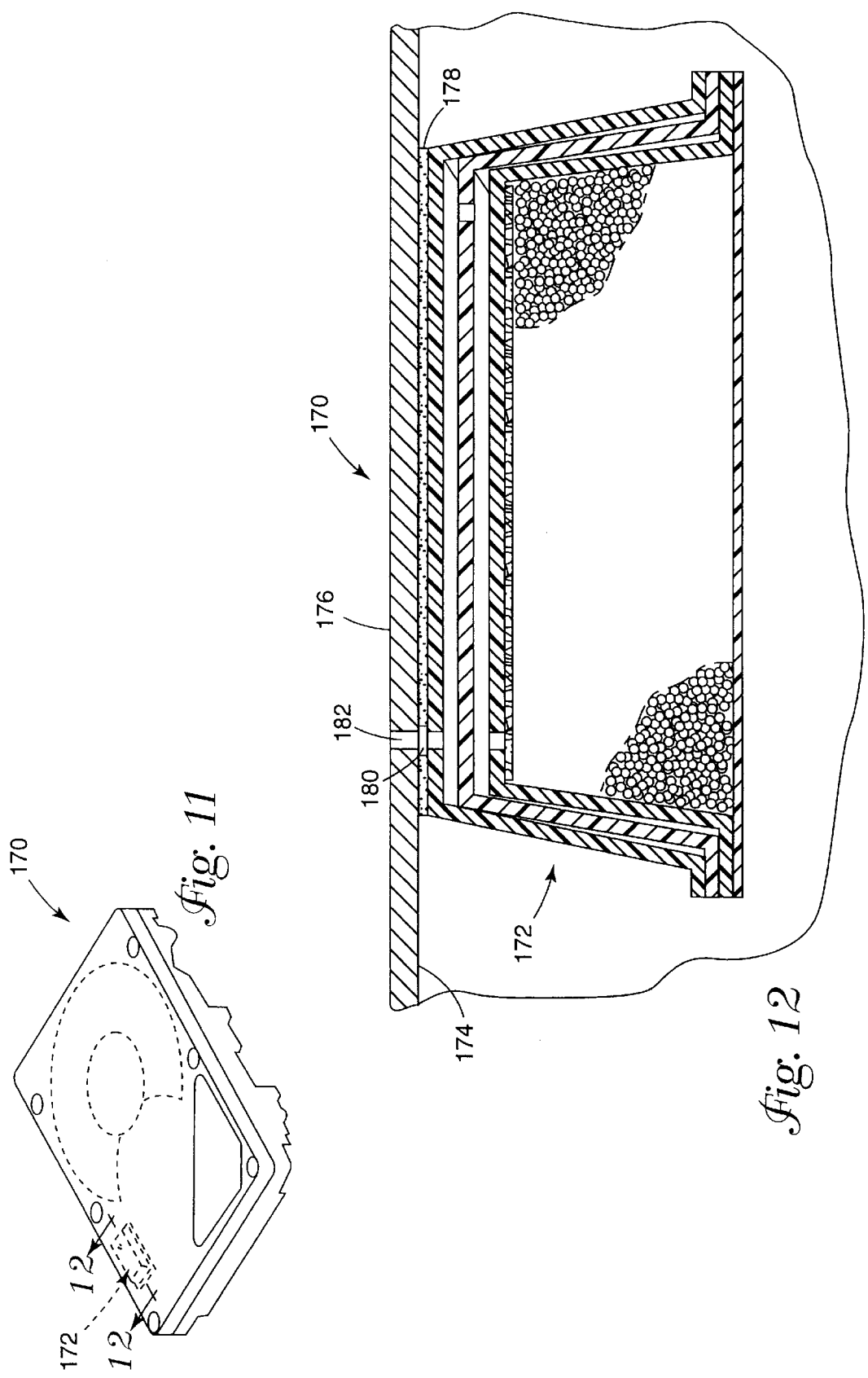

NESTED DIFFUSIONAL FILTER

BACKGROUND AND FIELD OF THE INVENTION

The present invention is directed at a diffusional channel and filter assembly and a method of making a diffusional channel assembly for use in an electronic assembly, particularly a hard disk drive, which assembly will provide a diffusion channel and optionally filtering functions.

Sensitive electronic equipment often require a substantially clean environment in order to operate efficiently and accurately without degradation of performance. These electronic devices are often contained in enclosures. In use, these electronic devices cycle between low and high temperatures, producing a change in the relative pressure in the enclosed devices relative to the external environment. The pressure differential produces an air exchange in the enclosure, with air exiting and entering the enclosure with the heating and cooling cycles respectively. It is important to remove chemical contaminants that are generated internal to the assembly during the high temperature cycles as well as to protect the enclosure from external contaminants such as gaseous or particulate material when it is cooling down. Also, differences in relative humidity inside and outside the enclosure can result in moisture vapor diffusing into the enclosure. Enclosures typically are provided with a vent that creates a preferred path for the ingress and egress of air to the enclosure. The vent can be equipped with an absorbent-type filter for gaseous contaminants and/or a particulate filter for particulate contaminants to protect any device housed within the enclosure. Preferably, a diffusion channel is provided in conjunction with the filter to help minimize moisture vapor ingress into the enclosure. The diffusion channel restricts the entry of water vapor into the device by creating a path that water molecules must diffuse through before they can enter the enclosure. Generally, the diffusion channel and filter are provided in series, with the diffusion channel interposed between the filter and the enclosure. However, alternative arrangements have been proposed such as using multiple diffusion channels and filters in various arrangements.

The diffusion channel typically has been integral to the enclosure housing, being formed by a casting or metal stamping technique. However, because of various design, manufacturing and cost considerations, a preferred approach with current disk drive designs has been to provide a diffusion tube and/or a filter assembly which can be directly attached to any generic enclosure provided through a vent hole. An example of this is approach described in U.S. Pat. No. 5,997,614, which describes a diffusion tube formed from a laminate of a filter and two or more film layers. The film layers which have cut-out portions which define a diffusion channel and/or vents, are generally attached to each other by use of adhesives. The filter is further attached to this laminate by use of adhesives. A problem with this approach is that the filter is underutilized due to the airflow being directed only to a portion of the filter material attached over the preformed vent opening in the flat film. The manufacturing process is also complicated in that there is the need to register multiple flat films having discrete die-cut arrangements to form a three-dimensional diffusion channel and vent. A similar approach is also discussed in U.S. Pat. No. 5,417,743 where the diffusion channel is formed not from a die-cut film but rather by cut-out pressure-sensitive adhesive layers. This approach is limited in that the diffusion chamber is in part defined by an adhesive covering layer which would make the material difficult to handle and apply and also create some problems in that the channel could be occluded by exposed adhesive within the channel. The adhesive could also result in difficulty by the creation of external outgas contaminants which could contaminate the disk drive.

U.S. Pat. No. 5,124,856 describes a combination of a diffusion channel and filter device formed by injection molded type pieces which are fit together to form a complicated structure. This device includes a multiple layer filter fit into a housing created by an upper diffusion plate and a bottom housing with a top tape element holding the elements together in conjunction with a bottom plate. This device is quite complicated and costly. This type of device is also disclosed in U.S. Pat. Nos. 5,030,260 and 4,863,499 which discloses a multiple molded pieces having a tortuous path formed within the molded housing pieces.

SUMMARY OF THE INVENTION

The present invention relates to a diffusion channel assembly for use with a device enclosure, generally an electronic device enclosure that goes through operational cycles that result in air being exchanged with the environment external to the enclosure. Two or more nested cups form the diffusion channel assembly. The cups are arranged sequentially in a manner that creates at least one diffusion channel between the adjacent nested cups. The nested cups are formed of a film material having cup portions that extend out of the plane defined by the opening of the inner cup and the sealed peripheral edges of the at least two cups that form the diffusion channel assembly of the present invention. Each cup portion has a perimeter seal portion that is preferably a lip portion. The lip portions are in a plane with cup portions that extend outward from the plane of the lip portions. Each of the cup portions has a perimeter seal portion around the entire outer perimeter of the cup portions. The perimeter seal portions form sealing surfaces that are sealed together on adjacent nested cup portions to form an integrated diffusion channel assembly.

The cup portions generally are integral with the lip portions; namely they are formed of the same continuous film material. Further each of the cup portions have vent holes formed somewhere in the film forming the cup portions. There is at least one gap formed between adjacent cup portions that forms a channel or passageway for the movement of air. The at least one gap is in fluid communication with the vent holes of the adjacent cup portions to form at least one diffusion channel of a length of at least about 5 mm. Preferably, multiple channels are combined into a single diffusion channel having a longer length.

In a preferred embodiment, the diffusion channel assembly further includes a filter material. The filter material is preferably located within a cavity formed by at least one cup portion. This cavity is preferably formed in the innermost cup portion of the assembly, but could be formed in a gap between two cup portions. Filter material contained in a cavity of an innermost cup portion is retained in that cavity by a cover layer. The cover layer is preferably attached to a lip portion of this innermost cup.

The invention further relates to a method of forming a diffusion channel filter assembly as described herein for use in combination with electronic enclosures. Generally this method comprises providing two or more films having a plurality of spaced cup portions on each film. Land areas are provided between the cup portions, which land portions are coextensive and coplanar. The cup portions are also provided with vent holes that are formed by conventional hole forming methods. The films are brought together resulting in nesting of the cup portions of adjacent films. Preferably a sorbent filter material is also placed into the cavity of the innermost cup portion and a cover layer brought in to contain the filter material with the cup portion. A perimeter seal is subsequently formed between the cup portions, and optionally the cover layer sealed to the perimeter seal, by an ultrasonic welding or heat sealing operation. The individual nested cup portions are separated to form discrete diffusion channel or diffusion channel filter assemblies.

BRIEF DESCRIPTION OF THE DRAWINGS

FIGS. 6a–8a are schematic illustrations of strips of the outermost (6a), middle (7a) and innermost (8c) cup portions, respectively, that can be used to form diffusion filter assemblies of the present invention.

FIGS. 6b–8b are side views of FIGS. 6a–8a respectively.

FIGS. 6c–8c are end views of FIGS. 6a–8a respectively.

FIGS. 6d–8d are top views of FIGS. 6a–8a respectively.

FIG. 11 is a schematic illustration of a diffusion filter assembly of the present invention adhered to the interior of the enclosure of a hard disk drive assembly.

FIG. 12 is a schematic illustration of cross section 12—12 of the adhered diffusion filter assembly of FIG. 11.

DETAILED DESCRIPTION OF A PREFERRED EMBODIMENT

Figure 1:
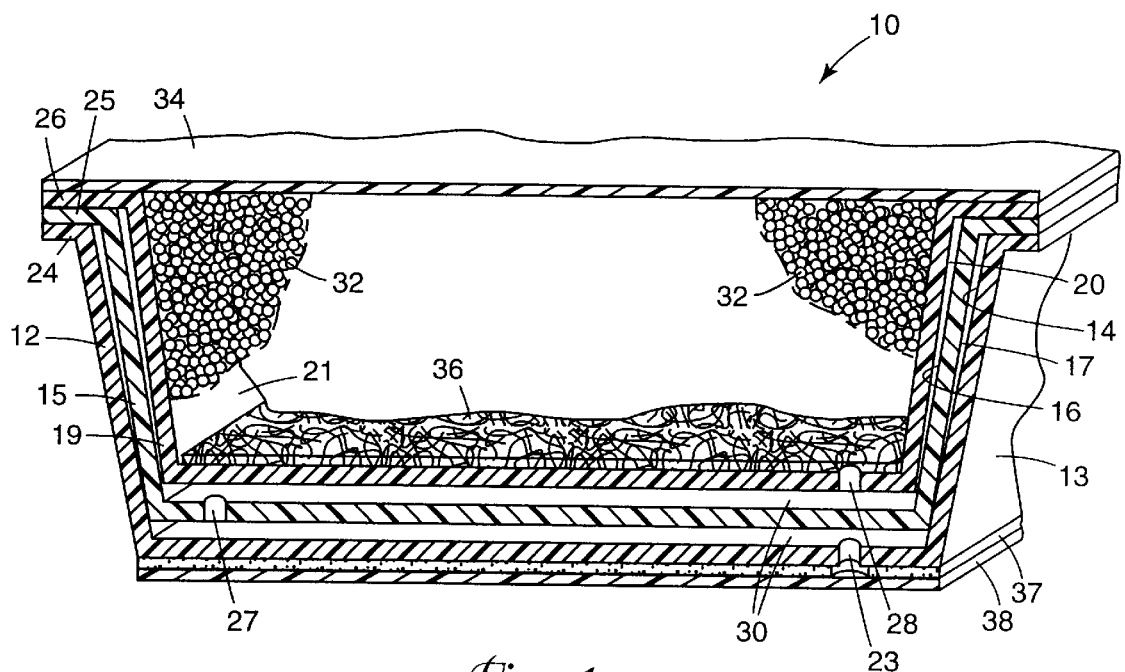
FIG. 1 is a schematic representation of a cross-section of diffusion filter assembly of the present invention.

The present invention provides a preformed diffusion channel assembly for use with device enclosures, particularly electronic device enclosures. The diffusion channel assembly can be easily attached to any enclosure having a vent opening and can provide a tortuous or non-tortuous path diffusion channel to minimize ingress of moisture vapor and contaminants into the enclosure from the external environment. Preferably a filter is also provided in line with the diffusion channel assembly to enable capture of gaseous or particulate contaminants in the air entering or leaving the diffusion channel filter assembly. The diffusion channel assembly of the invention can be easily attached, such as with adhesives, to any enclosure requiring filtered air and/or protection from environmental and/or internally generated contaminants. Specific enclosures suitable for use with the diffusion channel assemblies of the present invention are electronic device enclosures that contain devices that undergo temperature changes during operational cycles, producing pressure differentials that can produce an air exchange between the enclosure and the external environment. Also, differences in the relative humidity between internal and external environments could result in moisture vapor being drawn into the device enclosure during or after operational cycles. Such devices include, but are not limited to, electronic devices such as data storage devices, optical devices, or sensitive circuitry devices. Data storage devices include hard disk drives, optical drives and the like. Sensitive electronic devices such as those listed are typically located within enclosures that are generally airtight except for at least one vent hole that provides a preferred pathway to allow entry and exit of small volumes of air during the device's operational cycles. The diffusion channel assembly of the present invention can be attached over the vent hole in the enclosure to provide protection to the enclosed device.

The diffusion channel assembly of the present invention is formed of two or more nested cups. The nested cups form at least one diffusion channel, which diffusion channel is formed at least in part by gaps created between the nested cups and vent holes in the nested cups that connect the gaps. These gaps and connecting vent holes create a continuous fluid pathway. The nested cups are preferably formed of a thermoplastic film material. Generally, the film material has a final thickness in the assembly of from about 0.05 mm to about 0.60 mm, preferably from about 0.15 mm to about 0.50 mm. The finished film thickness will also generally vary over its cross section when the film is formed into the cup portions by a vacuum forming process or the like. Each of the nested cups has a perimeter seal portion that generally surrounds a cup portion formed in the film. This perimeter seal portion in part forms a sealing surface that is used to attach adjacent cups together and optionally to attach an outermost or innermost cup to a cover layer. The perimeter seal portions are formed so that they preferably both surround and are integral with a cup portion. The perimeter seal portions are preferably integral lip portions.

The cup portions are provided with the vent holes. The vent holes in the cup portions allow for air to enter, pass through, and then exit the diffusion channel assembly from the device enclosure to the external environment and vice versa. All cup portions are provided with at least one vent hole. There is also at least one gap formed between all adjacent cup portions. The gaps allow air to pass from a vent hole in one cup portion to a vent hole in an adjacent cup portion. The gap, or gaps, coupled with the vent holes of the adjacent cup portions form the at least one diffusion channel. The diffusion channel should have a total length of at least 5 mm, alternatively at least 10 mm, or at least 20 mm. Generally the longer the channel the better the protective function of the diffusion channel assemble with the upper limit in diffusion channel length dictated by pressure drop considerations for the particular application. Generally the upper limit in diffusion channel length for most typical applications would be about 60 mm. The desired diffusion channel length can be realized through the series co-operation of multiple shorter length channel segments. It is also contemplated that two or more diffusion channels could be provided in a diffusion channel assembly with filter material separating these diffusion channels. Additionally, it is also contemplated that two or more diffusion channel assemblies might be connected to a single filter material.

A filter material can be provided within at least one cup portion of the diffusion filter assembly. This filter material preferably is contained within the cavity of the innermost cup portion. In this embodiment, the filter material is contained within the cavity by a suitable permeable cover layer, such as a microporous membrane, a blown microfiber web, or a laminate of a permeable thermoplastic web (i.e. a blown microfiber web) and a glass fiber web, attached to the perimeter seal portion of the cup. Alternatively, the filter material can be located in a gap between two adjacent cup portions. In this embodiment, the filter material is contained by the two adjacent cup portions of the assembly and optionally permeable layers lining at least the portion of the cup portions provided with a vent hole.

As shown in FIG. 1, diffusion filter assembly 10 is formed from three nested cups 12, 15, and 19, each having an outer surface 13, 17, and 20 and an inner surface 14, 16, and 21, respectively. Outermost cup 12 has vent hole 23 that permits communication with the outer environment. Outermost cup 12 also has an integral lip 24 where the inner surface 14 of the integral lip is sealed to adjacent nested cup lip portions 25 and 26. Middle and innermost cup portions are also provided with vent holes 27 and 28, respectively. The three cup portions are sized so that there are gaps 30 formed between the cup portions when the lip portions are sealed together. A continuous perimeter seal is produced by sealing the lip portions of outermost cup 12, middle cup 15 and innermost cup 19. The gaps 30 created in the integral assembly, with the vent holes 23, 27 and 28, form a continuous pathway or diffusion channel from the external environment to the internal enclosure environment. The lip portions 24, 25 and 26 create a convenient surface that can be used to join the cups in a consistent and reproducible manner.

As shown in FIG. 1, filter material 32 is placed within a cavity formed by innermost cup 19. This filter material can be an integral self-supporting material that could be joined to the inner surface of the cup portion by binders or adhesives. Alternatively, the filter material can be loose or non-self-supporting material. When loose filter materials are used, an air permeable cover layer 34 is sealed to an inner surface 21 of the inner cup lip portion forming a barrier between the filter and the interior of the device enclosure or the external environment. This cover layer prevents filter material from entering the device enclosure or leaving the diffusion channel filter assembly. However the cover layer is air permeable to allow air to easily pass. This cover layer can also function as a particle filter layer. The cover layer is preferably a nonwoven web, such as a spunbond web, a bonded-carded web, a meltblown web or the like. Alternatively, the cover layer could be a membrane or a laminate of a membrane and a permeable nonwoven web, or a laminate of a permeable thermoplastic web and a glass fiber web. With a loose filter material, the inner surface of the inner cup portion is also generally provided with a permeable liner 36 to prevent particulate filter material from entering the vent hole 28 and the diffusion channel. This liner could be formed of a permeable nonwoven or membrane such as used for the cover layer. The filter material is preferably an adsorbent filter material, such as activated carbon, calcium carbonate, silica gel or the like, preferably a carbon such as particulate or fibrous carbon is used.

Alternatively, the filter material could be a particulate filter material such as a nonwoven filter web of charged or uncharged fibers.

The outer surface 13 of outermost cup portion 12 is preferably provided with a pressure-sensitive adhesive layer 37 for attaching the diffusion channel assembly to the inner surface of a device enclosure. Pressure-sensitive adhesive 37 can also be protected by a release liner 38 prior to use.

Figure 2:
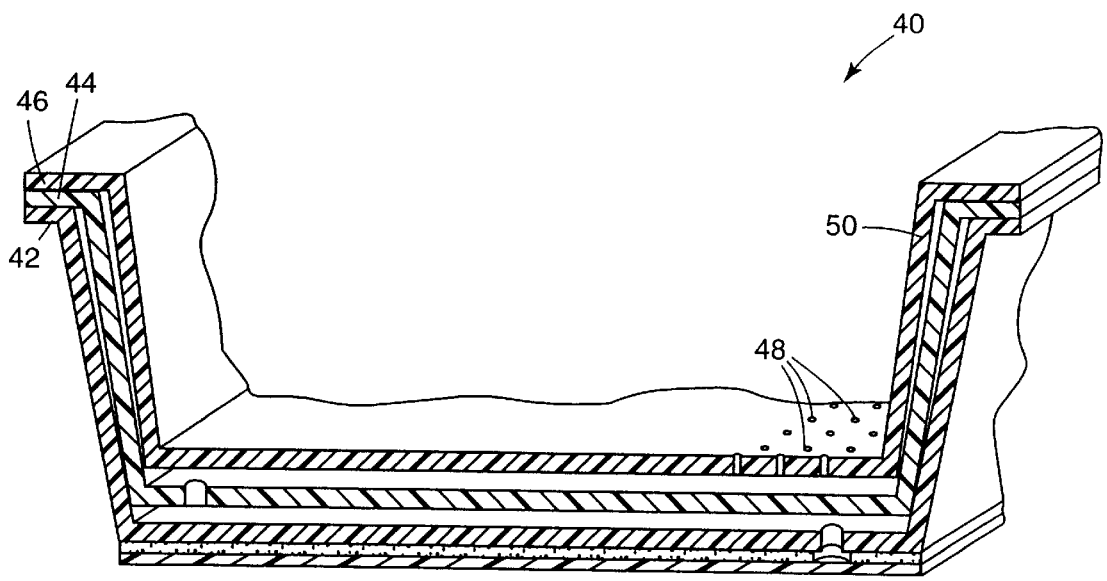
FIG. 2 is a schematic representation of a cross-section of diffusion filter assembly of the present invention illustrating an alternative vent hole arrangement on the innermost cup portion.

As shown in FIG. 2, the lip portions 42, 44, and 46 forming the sealing surfaces of diffusion channel assembly 40 are generally coplanar and coextensive around the periphery of the nested cups, as per the embodiment of FIG. 1. The lip portions mate so that they can be bonded together, forming an airtight seal around the cup portions. Preferably these surfaces are smooth and the lip portions are substantially flat. This allows the lip portions or other perimeter seal portions to be easily joined by thermomechanical means. As such, lip portions are preferably formed of a thermally sealable material, with the lip portions preferably thermally or ultrasonically sealed together. An alternative would be to have the cups and their lip portions formed of a multilayer film having an outer heat sealable layer on at least one face. This heat sealable layer need not necessarily be smooth, as the heat sealable layer would tend to flow during the heat sealing process. The cover layer is also preferably thermally sealed to the inner surface of the lip portion of the inner cup and as such is preferably formed of at least in part of a heat sealable material (e.g., heat sealable fibers). Alternatively, the perimeter seal portions could also be joined by adhesives or mechanical elements. With adhesive attachment, the perimeter seal portion could have a structured surface into which adhesive could flow and enhance engagement of the sealing surfaces. Diffusion channel assembly 40 also illustrates an alternative vent hole configuration on innermost cup 50. In this configuration, the single vent 28 of innermost cup 19 of diffusion channel assembly 40 has been replaced by a series of smaller holes 48. The use of smaller holes potentially eliminates the need for an inner scrim 36, as illustrated in FIG. 1, as well as providing a more uniform air flow distribution to the filter material.

Figure 3:
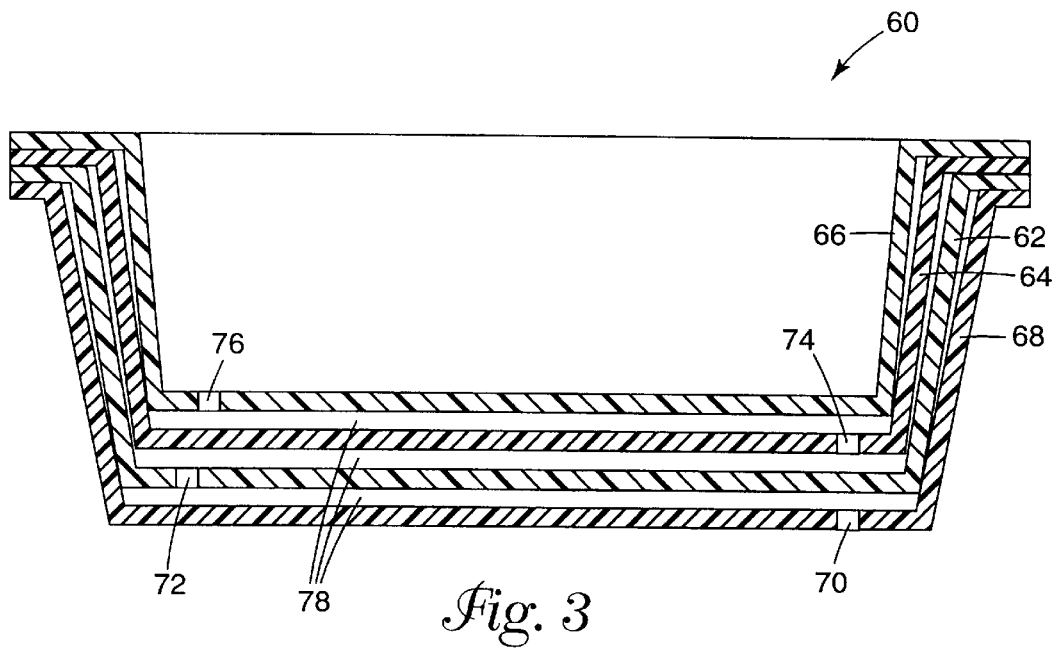
FIG. 3 is a schematic representation of a cross-section of diffusion filter assembly of the present invention having four nested cup portions.

As shown in the embodiment of FIG. 3, diffusion channel assembly 60 has two intermediate cups 62 and 64 provided between innermost cup 66 and outermost cup 68. The two intermediate cups also have a lip portion in this embodiment. The two intermediate cups also have cup portions with at least one vent hole. The use of two intermediate cups allows one to extend the length of the diffusion channel without increasing the cross sectional footprint of the diffusion channel assembly. Vent holes 70, 72, 74, and 76 of adjacent cups 68, 62, 64, and 66, respectively, are offset on the cup portions. Between each pair of offset vent holes at least one gap 78 is provided so that vent holes on adjacent cup portions are in fluid communication and form a continuous diffusion channel. Adding more cups lengthens the total overall length of the diffusion channel or channels without increasing the footprint of the diffusion channel assembly.

Generally as per the embodiment described above, the gap between adjacent cup portions is formed by an outer cup portion being sized slightly larger than the adjacent inner cup portion, forming a space or gap between the adjacent nested cup portions. The vent holes can be placed on adjacent cup portions in any offset location but preferably are positioned as far apart as possible (i.e. still connected by a suitable gap) on adjacent cup portions to increase the effective diffusion channel length. The vent holes generally are 0.5 mm$^2$ to 3.0 mm$^2$, preferably 0.78 mm$^2$ to 1.78 mm$^2$ in cross sectional area. Smaller vent holes create a greater resistance to airflow and larger vent holes allow moisture vapor to diffuse into the assembly more freely. The functional space or gap between the adjacent nested cup portions can vary between adjacent cup portions, but is generally from about 0.2 mm to about 1.0 mm in width at it's narrowest. The cross sectional area of the diffusion channels created by the gaps between adjacent channels are generally 0.5 mm$^2$ to 3.0 mm$^2$, preferably 0.8 mm$^2$ to 1.2 mm$^2$ in area. Smaller cross sectional areas would create a greater resistance to air flow and larger cross sectional areas allow moisture vapor to diffuse more freely.

Figure 4:
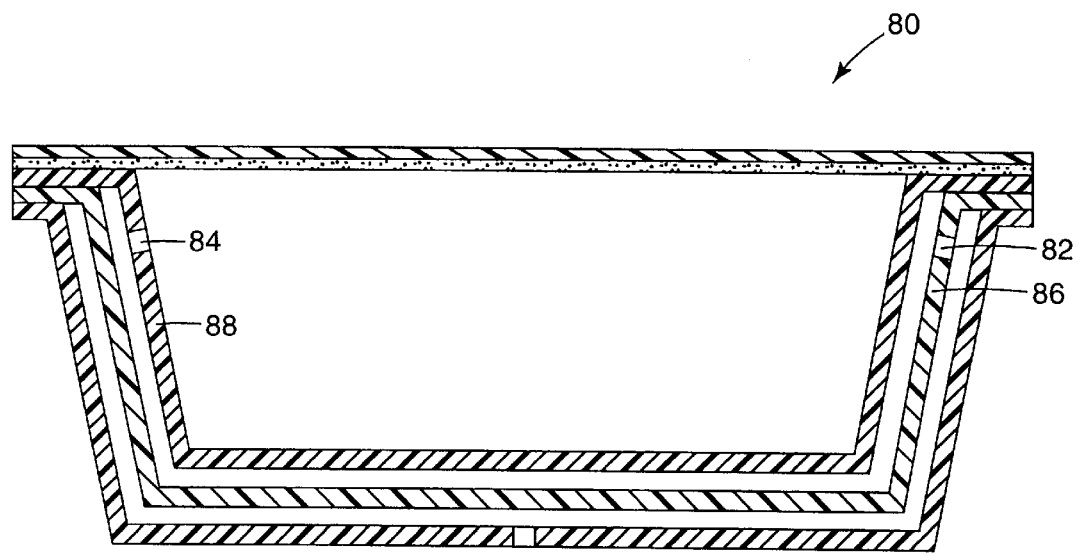
FIG. 4 is a schematic representation of a cross-section of diffusion filter assembly of the present invention illustrating an alternative placement of the vent holes on side wall portions of two of the cup portions of the assembly.

FIG. 4 illustrates a cross section of a diffusion assembly 80 of the present invention wherein vent holes 82 and 84 are placed on the sidewalls of middle cup 86 and innermost cup 88 respectively, to provide a longer diffusion path length.

Figure 5:
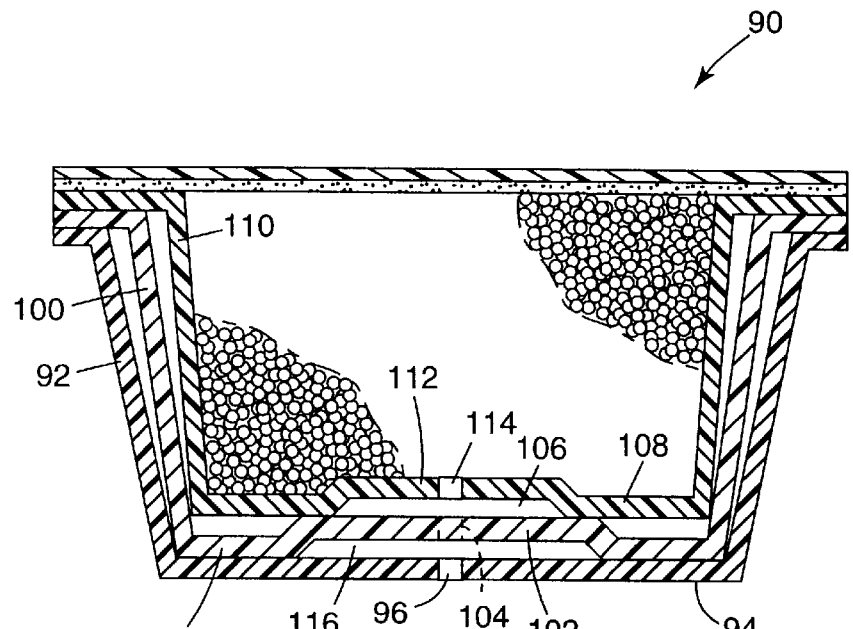
FIG. 5 is a schematic representation of a cross-section of an end view of a diffusion filter assembly of the present invention illustrating diffusion channels formed by molded features on the cup portions of the assembly.

FIG. 5 illustrates an end view of an alternative embodiment of producing diffusion channels in a diffusion channel assembly 90 of the present invention. In this embodiment, outermost cup 92 has a flat base 94 connecting its sidewall portions and vent hole 96 located in this base. The base portion 98 of middle cup 100 has a raised portion 102 containing vent hole 104. When outermost cup 92 is nested with middle cup 100, base portions 94 and 98 cooperate to form a first portion 116 of a diffusion channel. Base portion 108 of innermost cup 110 has a raised portion 112 containing vent hole 114, and when innermost cup 110 is nested with middle cup 100, base portions 98 and 108 cooperate to form a second portion 106 of a diffusion channel. In this embodiment the gaps are formed by the raised portions 102 and 112 cooperating with a surface of an adjacent nested cup portion. The raised portions are sized and configured generally so that if an inner cup portion is adjacent an outer cup portion having a raised portion the inner cup portion will have a flat surface that forms a gap or will have a raised portion that will form a gap. It this latter case the inner cup portion raised portion will be generally coextensive with at least a portion of the raised portion of the outer cup portion and either be slightly smaller in width to form a gap as shown in FIG. 5 or alternatively coextensive and slightly deeper and larger than the width of the outer raised portion to enclose the entire outer cup raised portion and form a gap.

FIGS. 6–8 are illustrations of strips of the outermost, middle and innermost cup portions, respectively, that can be used to form a diffusion filter assembly similar to that illustrated in FIG. 5. As shown in FIGS. 6a–d, strip 120 has cup portions 122 having supporting ribs 124 in the sidewall portions 126 to increase the rigidity of the cups. Strips 120 also have equally spaced holes 128 that interact with a gear drive mechanism in an assembly module, maintaining registration of multiple strips of cup portions to allow nesting on the cup portions of the strips. Cup portions 122 of strip 120 correspond to outermost cup 92 of FIG. 5, cup portions 132 of strip 130 correspond to middle cup 100 of FIG. 5, and cup portions 142 of strip 140 correspond top innermost cup 110 of FIG. 5. Base portion 134 of cup portion 132 of FIG. 7 has raised portion 136 corresponding to raised portion 102 of base portion 98 of FIG. 5. Similarly, base portion 144 of cup portion 142 of FIG. 8 has raised portion 146 corresponding to raised portion 112 of base portion 108 of FIG. 5.

Figure 9:
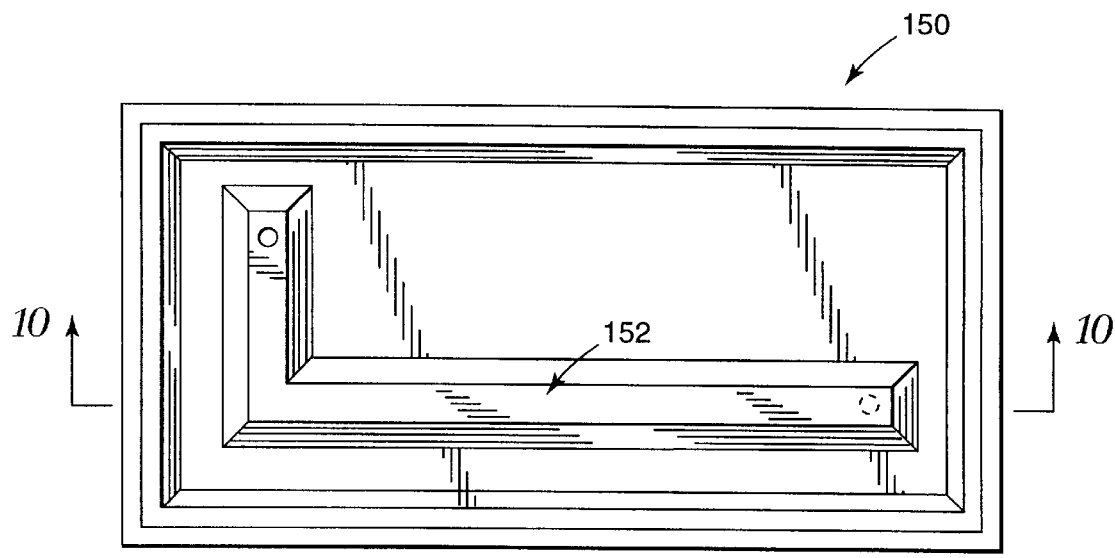
FIG. 9 is a schematic representation of a top view of a diffusion assembly of the present invention having a serpentine diffusion channel formed from two cup portions.
Figure 10:
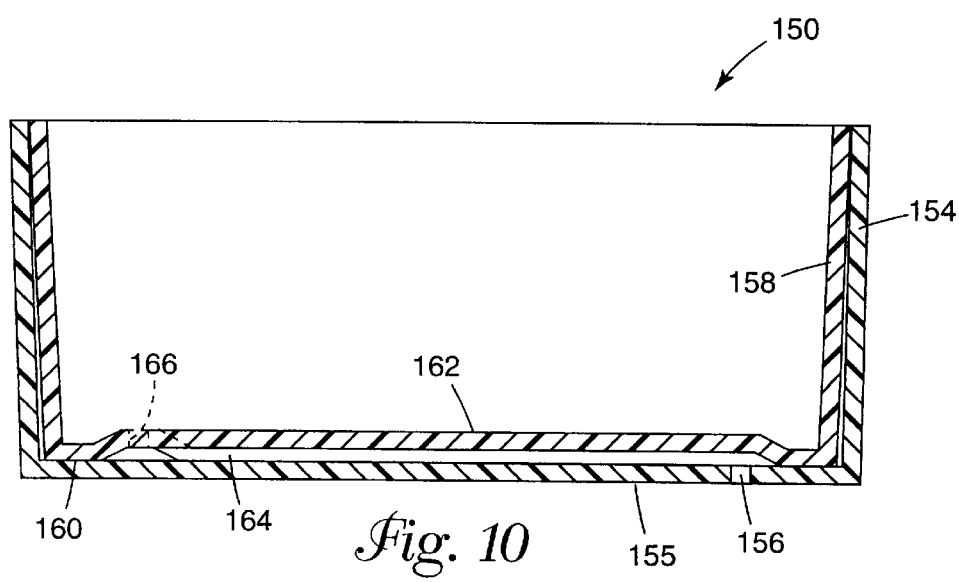
FIG. 10 is a schematic illustration of cross section 10—10 of the diffusion channel assembly of FIG. 9.

As shown in FIG. 9, the enclosed diffusion channels can extend in a serpentine manner on a cup portion, thereby greatly increasing the effective length of a diffusion channel formed between two adjacent cup portions. In this embodiment, diffusion channel assembly 150 has an extended length diffusion channel as a result of the "L" shape of the channel. FIG. 10, which is cross section 10—10 of diffusion assembly 150, illustrates how outermost cup 154 having a flat base portion 155 connecting the sidewall portions of the cup and vent hole 156 cooperate with raised portion 162 and vent hole 166 of base portion 160 of innermost cup 158 to form gap 164 of"L" shaped diffusion channel 152. It is further contemplated that additional cup portions could be added to diffusion channel assembly 150 to produce additional serpentine channel segments.

The thermoplastic film forming the cups is preferably a single or multilayer thermoplastic polymer film, such as a polyolefin film, a polyester film, a polycarbonate film or the like. A preferred film material is polyester film. The cup portions can be formed in a thermoplastic film by standard molding, vacuum forming, or embossing techniques. The vent holes can be formed such as by a die, hot needle, or laser drilling after the cup portions are formed.

FIG. 11 illustrates a diffusion channel filter assembly 172 of the present invention attached to the interior of the housing of a hard disk drive 170. FIG. 12 is an expanded cross section 12—12 of diffusion channel filter assembly 172. Assembly 172 is adhesively attached to the interior surface 174 of housing 176 by adhesive layer 178. Aperture 180 in adhesive layer 178 is slightly larger that vent hole 182 in housing 170 to facilitate positioning of assembly 172 on housing 176 without occlusion of the vent hole.

Figure 13:
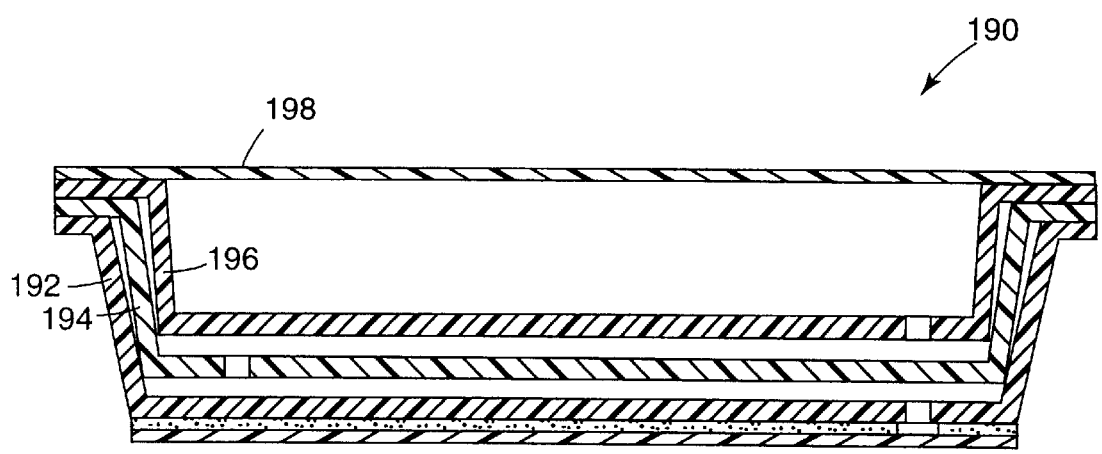
FIG. 13 is a schematic representation of a cross-section of a diffusion assembly of the present invention.
Figure 6A:
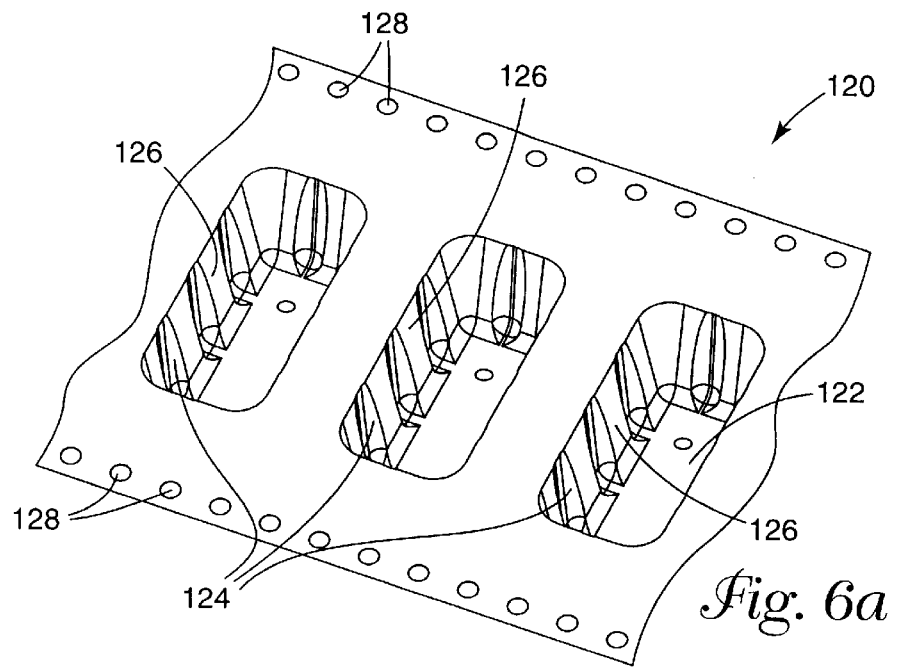
Figure 6C:
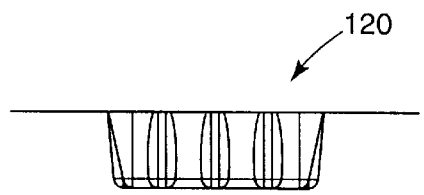
Figure 6D:
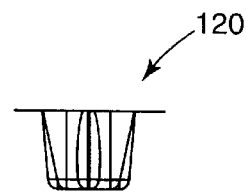
Figure 6B:
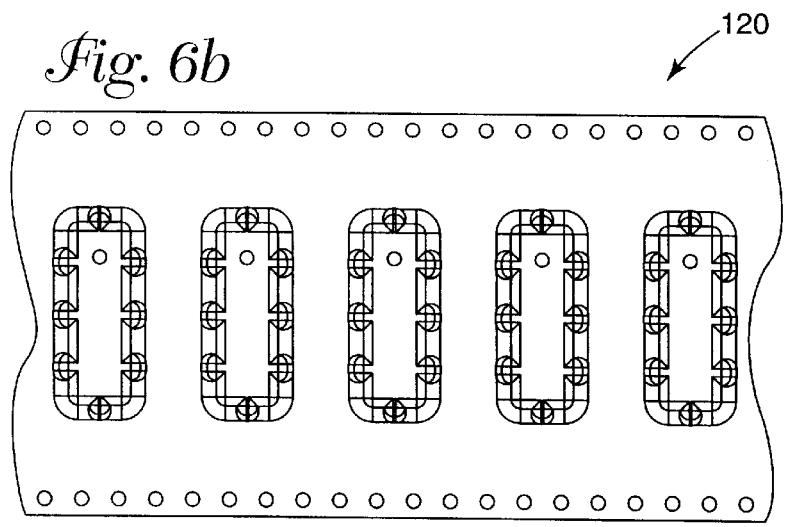
Figure 7A:
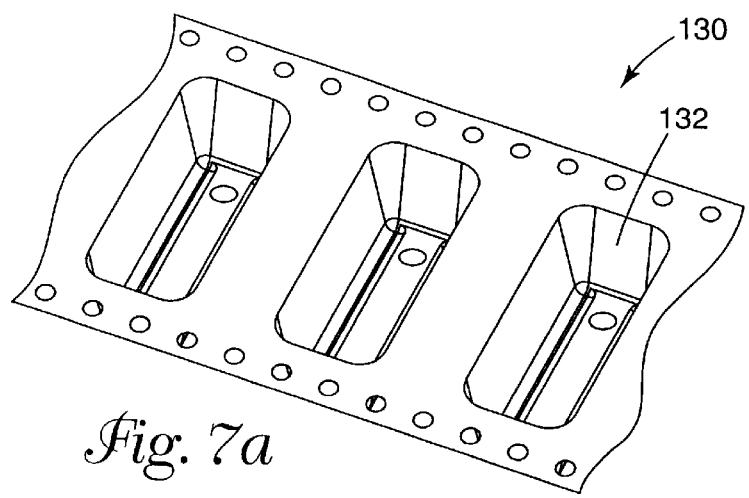
Figure 7C:
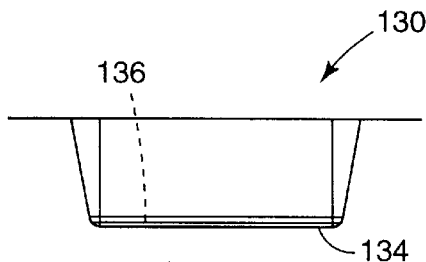
Figure 7D:
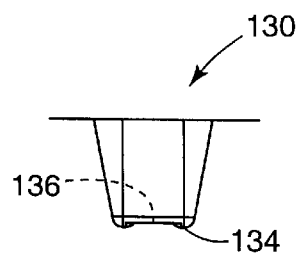
Figure 7B:
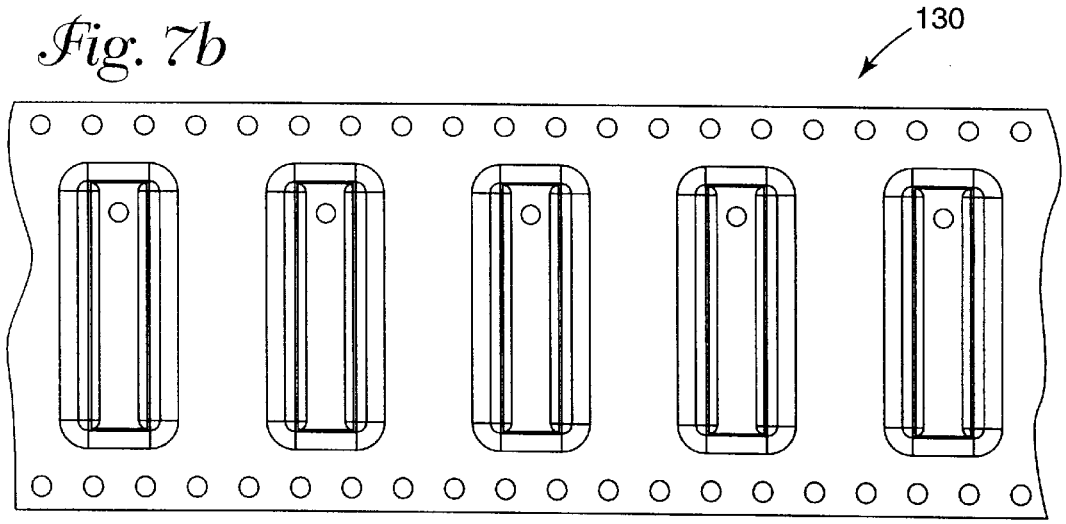
Figure 8B:
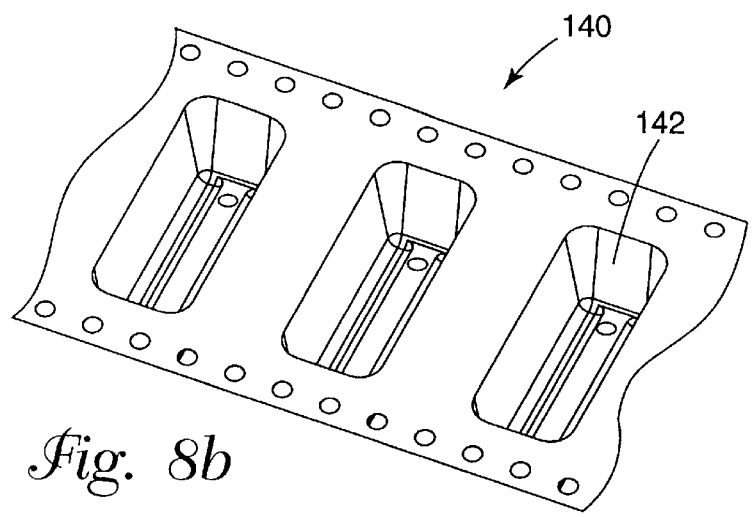
Figure 8C:
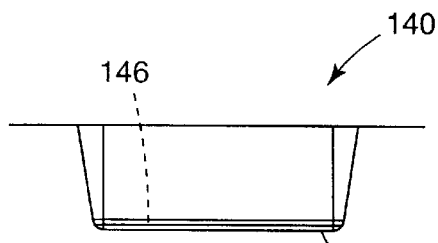
Figure 8D:
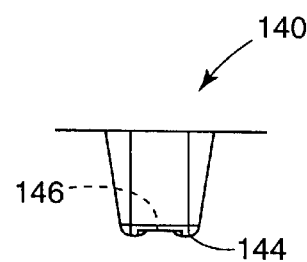
Figure 8A:
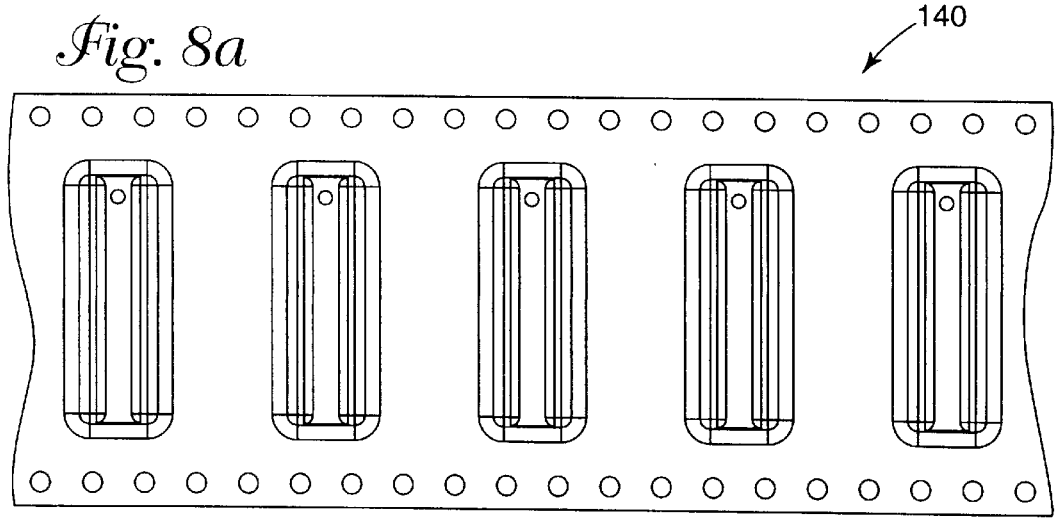

FIG. 13 is a schematic illustration of diffusion channel assembly 190 of the present invention that does not incorporate a filter element in conjunction with the diffusion channel assembly. In this embodiment cup portions 192, 194, and 196 are shallower than previous embodiments to provide a lower profile for the assembly. Assembly 190 may incorporate an optional particulate filter layer 198 to protect the device from particulate contaminants.

Figure 14:
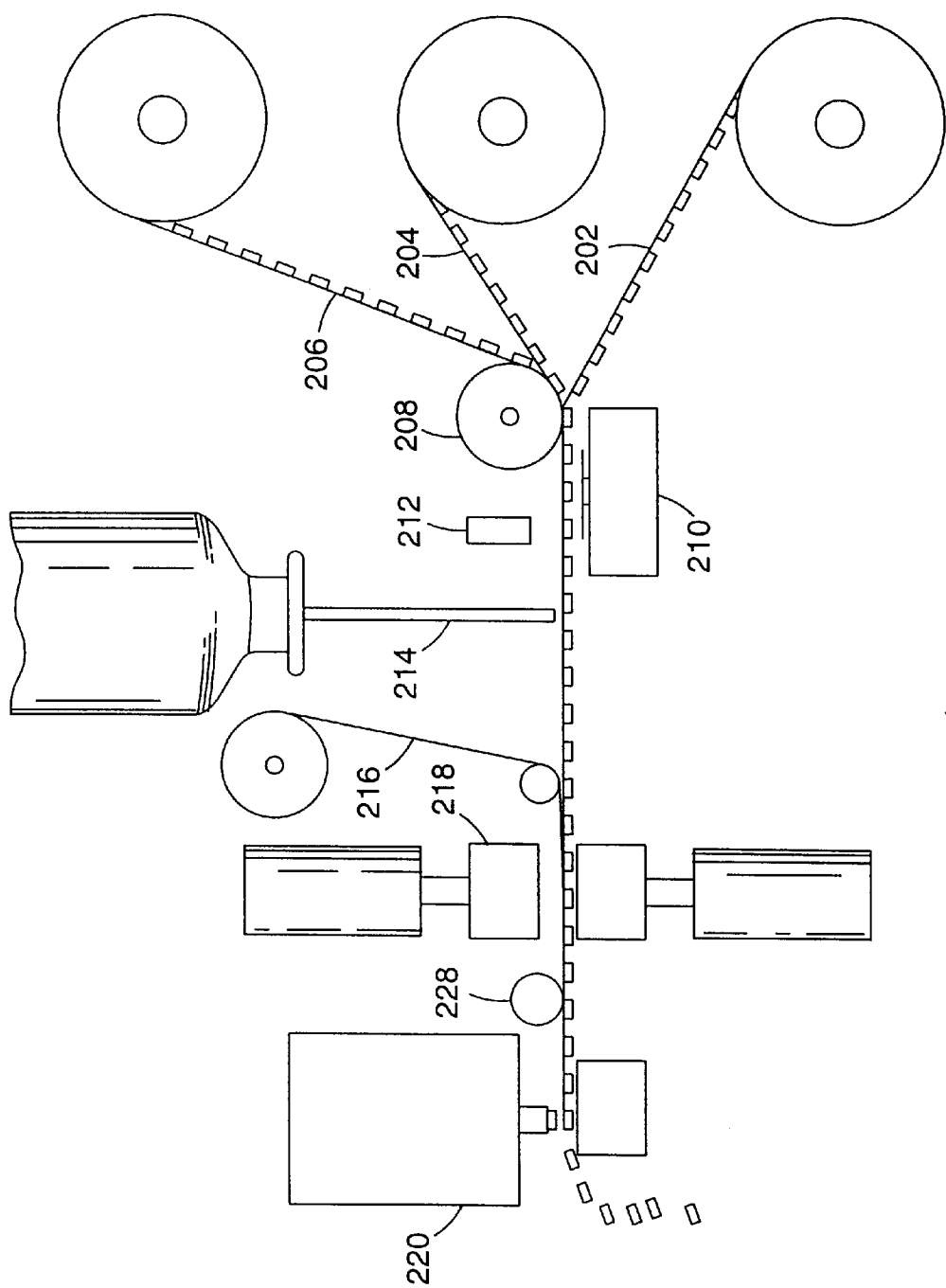
FIG. 14 is a schematic representation of a method of manufacturing the diffusion filter assemblies of the present invention.

A general method of forming the diffusion channel assemblies of the invention is shown in FIG. 14. Three films, 202, 204, and 206 having a plurality of spaced cup portions as illustrated in FIGS. 6–8 are brought together in a continuous manner, over a sprocket feed 208 which maintains the films in registration to allow nesting of the cup portions. Subsequent to nesting, transfer adhesive having a preformed aperture and protected by a release liner is applied 210 to the outermost cup surface such that the aperture in the adhesive is "in registration" with the vent hole in the outermost cup portion. An optional heat sealable nonwoven scrim is placed 212 in the cavity of the innermost cup and granular carbon sorptive particles are loaded into the cavity of the innermost cup at filling station 214. A continuous cover web 216 is then brought in to cover the filled innermost cup portion and the continuous perimeter seal formed and the cover layer sealed to the assembly concurrently in a heat sealing operation 218. The formed assemble is further driven by sprocket feed 228. The sealed assembly is then rule die cut 220 into individual nested cup portions to form discrete diffusion channel filter assemblies.

EXAMPLE

Three flexible film constructions, 44 mm wide with a series of substantially rectangularly shaped cups, were prepared using a thermoforming process similar to that described in U.S. Pat. No. 5,738,816 (Tidemann et al.) using glycol modified poly(ethylene terephthalate) (available from Eastman Chemical Company, Kingsport, Tenn., under the designation "KODAR" PETG Copolyester 6763). The cups of film "A" were shaped as illustrated in FIG. 6, having a 23.19 mm×9.89 mm top opening, a 20.04 mm×4.74 mm base, a 8.91 mm height, a 5° draft on the sidewall portions and a 12° draft on the reinforcing sidewall rib. The cups of film "B" were shaped as illustrated in FIG. 7, having a 22.46 mm×9.16 mm top opening, a 19.64 mm×6.34 mm base, a 8.82 mm height, and a 10.5° draft on the sidewall portions. The longitudinal channel in the base was 3.00 mm wide and 0.33 mm deep. The cups of film "C" were shaped as illustrated in FIG. 8, having a 21.64 mm×8.34 mm top opening, a 19.34 mm by 6.04 mm base, a 8.49 mm height, and a 9° draft on the sidewall portions. The longitudinal channel in the base was 2.00 mm wide and 0.04 mm deep.

Subsequent to forming the films, a 1.5 mm diameter hole was punched into the base of the cups of each film, positioned on the centerline of the base and 3 mm from the sidewall.

Three cup portions of the three films were nested together such that cup of film "A" formed the outer element of the construction, the cups of film "B" the middle element, and the cups of film "C" the inner element of the construction. The films were nested so that the holes in the base of the cups were in an alternating arrangement so that a structure similar to that illustrated in FIG. 5 produced a diffusion channel. The nominal distance between the holes of the adjacent cup bases was 14 mm. A rectangular piece of nonwoven web (Remay Style 2014 spunbond polyester, Old Hickory, Tenn., 5 mm×19 mm) was placed in the base of the cups of film "C" and the cup filled with $K_2CO_3$ treated (1% $K_2CO_3$) beaded (average particle size 590 microns) activated carbon (available from MHB FILTRATION GMBH Co., Erkrath, Germany). The filled cups were covered with a breather filter membrane consisting of a spunbond polyester that was thermally laminated to BHA-TEX Expanded Microporous PTFE Membrane, HEPA grade (available from BHA Technologies, Lee Summit, Mo.). The total construction was consolidated into a unified structure by heat sealing the top land areas and the breather filter together in a heat sealer unit. The sealer unit consisted of a stationary lower anvil maintained at 140° C. and having a cavity to receive the stacked pocket construction, and a movable upper anvil maintained at 180° C. The stacked cup construction was placed in the lower anvil, the upper anvil brought into contact with the stacked cup assembly under 900 N pressure and the pressure maintained for approximately six seconds. Subsequent to heat sealing the individual integrated diffusion channel filter assembles were rule die cut from the film assemblies. Subsequent to rule die cutting, a piece of an acrylic based viscoelastic damping polymer (#3M242R02, available from 3M Co., St. Paul, Minn.) 5 mm×18 mm and having a circular aperture 2 mm in diameter, was placed on the outer face of the base of the cups of film "A" such that the aperture was centered around the hole in the base of the pocket. The PSA adhesive was covered with Scotchpak™ Fluoropolymer Coated Release Liner (#3M1022, available from 3M Co., St. Paul, Minn.).

Air flow/pressure drop correlation for the integrated filter assembly was determined by adjusting the air flow rate through the unit at a pressure drop of 1.27 cm (0.5 inches) of water. Typical airflow at a 1.27 cm pressure drop for the integral filter construction was 245 ml/min. Integrated filter units of the present invention could be prepared that had air flow rates ranging from about 25 ml/min. to about 270 ml/min. by changing the diameter of the hole in each component of the filter unit and/or the cross-sectional area of the diffusion channels.

The diffusion rate through the integrated filter unit was calculated from the weight gain data. This data was generated by adhesively mounting a filter unit over a hole in a jar lid, screwing the lid on a jar (118 cm³, 4.0 oz.) volume that contained dry calcium sulfate (approximately 40 gms), and daily monitoring the weight gain of the jar when it was placed in a humid environment, T=78 F., RH=86%. The calculated diffusion rate was 6.52 μg/min. Integrated filter units of the present invention could be prepared that had calculated diffusion rates ranging from about 1.39 μg/min. to about 9.93 μg/min. by changing the diameter of the hole in each component of the filter unit and/or the cross-sectional area of the diffusion channels.

I claim:

1. A diffusion channel assembly for use with a device enclosure comprising two or more film layers, at least two of said film layers forming cup portions wherein two or more of the cups portions are nested one inside the other and wherein adjacent film layers are spaced from each other to form at least one gap, each of said film layers having a perimeter seal portion substantially around the entire outer perimeter of the film layer, wherein said perimeter seal portions surround the cup portions and form a sealing surface, the perimeter seal portions of adjacent film layers being sealed to create a continuous seal around the cup portions, wherein at least one gap coupled with the vent holes of an adjacent film layer forming at least one diffusion channel.

2. The diffusion channel assembly of claim 1 wherein the perimeter seal portion is a lip portion.

3. The diffusion channel assembly of claim 2 wherein the lip portions extend in a plane and the cup portions extend out of the plane of the lip portions.

4. The diffusion channel assembly of claim 3 wherein said at least one diffusion channel has a length of at least 5 mm.

5. The diffusion channel assembly of claim 2 further comprising a filter material within at least one cup portion.

6. The diffusion channel assembly of claim 5 wherein the filter material is located within a cavity formed by the inner surface of the innermost cup portion.

7. The diffusion channel assembly of claim 6 wherein an air permeable cover layer is sealed to an inner surface of an innermost film layer lip portion forming a barrier between the filter and an external environment.

8. The diffusion channel assembly of claim 7 wherein the cover layer is a nonwoven web.

9. The diffusion channel assembly of claim 7 wherein the filter material is an adsorbent filter media.

10. The diffusion channel assembly of claim 6 wherein the filter material is a particulate filter material.

11. The diffusion channel assembly of claim 5 wherein the filter material is beaded carbon.

12. The diffusion channel assembly of claim 2 wherein the film layer cup portions and lip portions are integral and the nested cups each have an outer surface and an inner surface, an outer film layer cup portion having an outer vent hole for communication with an environment outside the diffusion channel assembly, the outer film layer cup portion having an integral lip, wherein the inner surface of the integral lip is sealed to an adjacent film layer lip portion, an inner film layer cup portion is also provided having an inner vent hole, wherein the outer surface of the inner film layer lip portion is sealed to an adjacent nested cup lip portion.

13. The diffusion channel assembly of claim 12 wherein the lip portions form sealing surfaces and are coplanar and coextensive around the periphery of the film layers and have a substantially smooth outer or inner surface.

14. The diffusion channel assembly of claim 13 wherein the lip portions are substantially flat.

15. The diffusion channel assembly of claim 13 wherein the lip portions comprise a thermally sealable material.

16. The diffusion channel assembly of claim 15 wherein the lip portions are ultrasonically sealed.

17. The diffusion channel assembly of claim 16 wherein a cover layer is thermally sealed to the inner surface of the lip portion of an innermost film layer.

18. The diffusion channel assembly of claim 12 wherein there is further provided at least one intermediate film layer cup portion between an inner film layer cup portion and an outer film layer cup portion, said intermediate film layer having a lip portion joined at its inner surface and at its outer surface to adjacent film layer lip portions, and said intermediate film layer cup portion having at least one vent hole.

19. The diffusion channel assembly of claim 12 wherein the vent holes of adjacent film layer are offset on the cup portions with at least one continuous gap provided between the offset vent holes so that vent holes on adjacent cup portions are in fluid communication and form a diffusion channel.

20. The diffusion channel assembly of claim 12 wherein the gap is formed by an outer cup portion being slightly larger than an adjacent inner cup portion forming a gap between the adjacent nested cup portions.

21. The diffusion channel assembly of claim 20 wherein the gap between the adjacent nested cup portions if from 0.2 mm to 1.0 mm.

22. The diffusion channel assembly of claim 21 wherein the cup portions have a relatively flat base portion and sidewall portions that connect the base portion to the lip portion.

23. The diffusion channel assembly of claim 22 wherein the vent holes are located on the base portions.

24. The diffusion channel assembly of claim 22 wherein the vent holes are located on the sidewall portions.

25. The diffusion channel assembly of claim 12 wherein at least an outermost film layer cup portion has a relatively flat base portion and a sidewall portion that connects the base portion to the lip portion.

26. The diffusion channel assembly of claim 25 wherein the outer surface of the base portion is provided with a pressure-sensitive adhesive layer for attaching the diffusion channel assembly to an enclosure.

27. The diffusion channel assembly of claim 12 wherein at least one cup portion has a channel portion formed in the at least one cup portion, the channel portion surrounded by a rim which can engage with a surface of an adjacent cup portion forming the gap, the channel portion containing a vent hole and being in fluid communication with a vent hole of adjacent nested cup portion.

28. The diffusion channel assembly of claim 27 wherein there are channel portions on two or more adjacent nested cup portions and the gap formed between the adjacent nested cup portions is from 0.2 mm to 1.0 mm.

29. The diffusion channel assembly of claim 27 wherein the total diffusion channel length is at least 5 mm to 40 mm.

30. The diffusion channel assembly of claim 12 wherein the film layers comprise a thermoplastic polymer film.

31. The diffusion channel assembly of claim 30 thermoplastic polymer film is a polyester film.

32. The diffusion channel assembly of claim 1 wherein in the vent holes in the cup portions are 0.5 $mm^2$ to 3.0 $mm^2$.

33. A method of forming a diffusion channel assembly for use in electronic enclosures comprising providing a two or more film layers having a plurality of cup portions spaced equally along the length of two or more film layers and land areas between the cup portions, providing vent holes in the cup portions, continuously nesting the cup portions of adjacent film layers forming gaps between the adjacent cup portions, continuously adhering the land areas between the cup portions and separating individual nested cup portions to form discrete diffusion channel assemblies.

34. The method of claim 33 further comprising filling cavities formed by the cup portions of an innermost film layer with a filter material.

35. The method of claim 34 wherein filling said cavities with a filter material comprises filling with a loose filter material and further comprising attaching a permeable cover to the land areas to contain the filter material.

* * * * *

UNITED STATES PATENT AND TRADEMARK OFFICE
CERTIFICATE OF CORRECTION

PATENT NO. : 6,475,270 B1
DATED : November 5, 2002
INVENTOR(S) : Graeve, Eric G.

It is certified that error appears in the above-identified patent and that said Letters Patent is hereby corrected as shown below:

Column 2,
Line 17, insert -- of -- following "multiple".

Column 10,
Line 10, delete "I" and insert in place thereof -- We --.

Column 11,
Line 24, delete "if" and insert in place thereof -- is --.

Signed and Sealed this

Sixth Day of May, 2003

JAMES E. ROGAN
*Director of the United States Patent and Trademark Office*